(12) United States Patent
Hsu et al.

(10) Patent No.: US 10,812,396 B2
(45) Date of Patent: *Oct. 20, 2020

(54) BUFFER STATUS REPORT AND LOGICAL CHANNEL PRIORITIZATION FOR DUAL CONNECTIVITY

(71) Applicant: HFI INNOVATION INC., Zhubei, Hsinchu County (TW)

(72) Inventors: Chia-Chun Hsu, New Taipei (TW); Per Johan Mikael Johansson, Kungsangen (SE)

(73) Assignee: HFI INNOVATION INC., Zhubei, Hsinchu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/057,456

(22) Filed: Aug. 7, 2018

(65) Prior Publication Data

US 2018/0375776 A1 Dec. 27, 2018

Related U.S. Application Data

(63) Continuation of application No. 14/606,913, filed on Jan. 27, 2015, now Pat. No. 10,075,381.
(Continued)

(51) Int. Cl.
H04L 12/819 (2013.01)
H04W 28/02 (2009.01)
(Continued)

(52) U.S. Cl.
CPC ............ *H04L 47/21* (2013.01); *H04L 47/31* (2013.01); *H04W 28/0278* (2013.01);
(Continued)

(58) Field of Classification Search
CPC .... H04L 47/21; H04L 47/31; H04W 72/0486; H04W 28/0278; H04W 28/08; H04W 72/1284; H04W 28/085
See application file for complete search history.

(56) References Cited

U.S. PATENT DOCUMENTS 8,576,714 B2 11/2013 Yang
2003/0123392 A1 7/2003 Ruutu
(Continued)

FOREIGN PATENT DOCUMENTS

CN 103533662 A 1/2014
EP 2094038 A1 8/2009
(Continued)

OTHER PUBLICATIONS

EPO, Search Report for the EP patent application 15742643.8 dated Aug. 19, 2016 (7 pages).
(Continued)

Primary Examiner — Ivan O Latorre
(74) Attorney, Agent, or Firm — Oblon, McClelland, Maier & Neustadt, L.L.P.

(57) ABSTRACT

Apparatus and methods are provided to enhance BSR and LCP procedures for the dual connectivity system. In one novel aspect, the BSR is handled for each MAC entity according to one or more allocation rules. In one embodiment, the allocation rule is configured by the network. In another embodiment, the allocation rule is determined by the UE based on historic statics. In yet another embodiment, the allocation rule is determined by the UE based on information from the network. In one embodiment, the allocation rule indicates percentage of traffic allocated to each MAC entity. In another novel aspect, LCP is performed independently for each MAC entity if the split bearer is configured and the prioritized bit rate (PBR) and the bucket size duration (BSD) are signaled for each eNB. In one embodiment, separate sets of LCG variables are maintained independently for each MAC entity.

18 Claims, 8 Drawing Sheets

Related U.S. Application Data

(60) Provisional application No. 61/932,332, filed on Jan. 28, 2014.

(51) Int. Cl.
| | | |
|---|---|---|
| *H04W 72/04* | (2009.01) | |
| *H04W 72/12* | (2009.01) | |
| *H04W 28/08* | (2009.01) | |
| *H04L 12/833* | (2013.01) | |

(52) U.S. Cl.
CPC ....... *H04W 28/08* (2013.01); *H04W 72/0486* (2013.01); *H04W 72/1284* (2013.01); *H04W 28/085* (2013.01)

(56) References Cited

U.S. PATENT DOCUMENTS

| | | | |
|---|---|---|---|
| 2007/0258362 A1 | 11/2007 | Lee | |
| 2008/0037428 A1 | 2/2008 | Nation | |
| 2008/0225893 A1* | 9/2008 | Cave | H04L 1/1874 370/476 |
| 2009/0219951 A1 | 9/2009 | Chun et al. | |
| 2009/0225711 A1 | 9/2009 | Sammour | |
| 2010/0115355 A1 | 5/2010 | Hsu | |
| 2011/0296064 A1 | 12/2011 | Ehsan | |
| 2012/0120843 A1 | 5/2012 | Anderson | |
| 2012/0147869 A1* | 6/2012 | Chhatriwala | H04W 28/065 370/338 |
| 2013/0176988 A1 | 7/2013 | Wang | |
| 2013/0215745 A1 | 8/2013 | Shubhakoti | |
| 2014/0064219 A1 | 3/2014 | Quan | |
| 2014/0126399 A1 | 5/2014 | Damnjanovic | |
| 2014/0342748 A1 | 11/2014 | Zou | |
| 2015/0085800 A1 | 3/2015 | Sivanesan | |
| 2015/0098322 A1 | 4/2015 | Chen | |
| 2015/0117241 A1* | 4/2015 | Koc | H04B 17/318 370/252 |
| 2015/0230082 A1 | 8/2015 | Li | |
| 2015/0334737 A1 | 11/2015 | Susitaival | |
| 2016/0157265 A1 | 6/2016 | Lee | |
| 2016/0198491 A1 | 7/2016 | Lee | |
| 2016/0234714 A1 | 8/2016 | Basu Mallick | |
| 2016/0262149 A1 | 9/2016 | Futaki | |
| 2016/0295442 A1 | 10/2016 | Virtej | |
| 2017/0156145 A1* | 6/2017 | Marinier | H04L 47/36 |

FOREIGN PATENT DOCUMENTS

| | | | | |
|---|---|---|---|---|
| EP | 2182770 A2 | 5/2010 | | |
| WO | WO-2009096743 A2 * | 8/2009 | ............ | H04L 69/03 |
| WO | WO-2014185648 A1 * | 11/2014 | ........ | H04W 72/1284 |

OTHER PUBLICATIONS

International Search Report and Written Opinion of International Search Authority for PCT/CN2015/071756 dated Mar. 27, 2015 (13 pages).
3GPP TSG-RAN Study on Small Cell Enhancements for E-UTRA and E-UTRAN; Higher Layer Aspects (Release 12) 3GPP TR 36.842 v12.0.0; Dec. 31, 2013; sections 7.1, 8.1.2,8.2.
R2-132583 3GPP TSG-RAN2 Meeting #83; LG Electronics Inc.; BSR Impacts by Bearer Split; Barcelona, Spain dated Aug. 19-23, 2013 (4 pages).
R2-132584 3GPP TSG-RAN2 Meeting #83; LG Electronics Inc.; LCP Impacts by Bearer Split; Barcelona, Spain dated Aug. 19-23, 2013 (5 pages).
Combined Chinese Office Action and Search Report dated Oct. 31, 2018 in Patent Application No. 201580001142.2 (with English translation of Categories of Cited Documents), citing documents AX and AY therein, 10 pages.
"Study on Small Cell Enhancements for E-UTRA and E-UTRAN; Higher Layer Aspects (Release 12)" 3GPP TR 36.842 V12.0.0, Dec. 31, 2013, pp. 1-71.
"BSR Impacts by Bearer Split" LG Electronics Inc., 3GPP TSG-RAN2 Meeting #83, R2-132583, Aug. 23, 2013, pp. 1-4.
Office Action dated Nov. 4, 2019 in Indian Patent Application No. 3016/MUMNP/2015, 6 pages.
3rd Generation Partnership Project; Technical Specification Group Radio Access Network; Evolved Universal Terrestrial Radio Access (E-UTRA); Study on Small Cell Enhancements for E-UTRA and E-UTRA—Higher layer aspects (Release 12), Technical Report, 3GPP TR 36.842 V1.0.0, (Nov. 2013), 69 pages.

* cited by examiner

BUFFER STATUS REPORT AND LOGICAL CHANNEL PRIORITIZATION FOR DUAL CONNECTIVITY

CROSS REFERENCE TO RELATED APPLICATIONS

This application is a continuation of and claims the benefit of priority under 35 U. S.C. § 120 from U.S. application Ser. No. 14/606,913, filed Jan. 27, 2015, which claims priority under 35 U.S.C. § 119 from U.S. Provisional Application No. 61/932,332, entitled "BSR AND LCP FOR DUAL CONNECTIVITY" filed on Jan. 24, 2014, the entire contents of both of which are incorporated herein by reference.

TECHNICAL FIELD

The disclosed embodiments relate generally to wireless communication, and, more particularly, to BSR and LCP for dual connectivity.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, such as evolved Node-B's (eNBs) communicating with a plurality of mobile stations referred as user equipment (UEs). The dual connectivity (DC) UE is introduced to enhance bandwidth and flexibility use of the network. A UE with dual connectivity has more than one transceivers corresponding to more than one MAC entities. The multiple MAC entities can be configured to communicate with multiple eNBs simultaneously. With improved efficiency and flexibility, improvements for various functional tasks are desired. Two of such areas are buffer status report and logic group prioritization.

A Buffer status report (BSR) is sent from the UE to the serving eNB to provide information about the amount of pending data in the uplink buffer of the UE. The buffer status, along with other information, such as priorities allocated to different logical channels, is useful for the uplink scheduling process to determine which UEs or logical channels should be granted radio resources at a given time. The UE communicates the BSR to the scheduler in the base station so that the base station has sufficient information about the data waiting in the UE for UL transmission. The base station can allocate appropriate UL resource for the UE in a timely manner. Traditionally, the UE reports the buffer status to only one base station, which is its serving base station. This method encounters problem with the use of dual connectivity.

The logical channel prioritization (LCP) is required to make sure that all UE serves the uplink logical channels in a predefined sequence. LCP is performed when a new transmission is prepared. In the current system, where only one MAC entity for each UE, the LCP is performed at the UE level, taking into account all data buffered. With the dual connectivity for the UE, each MAC entity has its corresponding set of logical channel group (LCP). Different procedures are desired to improve the performance for LCP in a dual connectivity system.

Improvements and enhancements are required for UE BSR and LCP procedures to communicate and manage multiple schedulers from different base stations.

SUMMARY

Apparatus and methods are provided to enhance BSR and LCP procedures for the dual connectivity system. In one novel aspect, the BSR is handled for each MAC entity according to one or more allocation rules. In one embodiment, the allocation rule is configured by the network. In another embodiment, the allocation rule is determined by the UE based on historic statistics. In yet another embodiment, the allocation rule is determined by the UE based on information from the network. In one embodiment, the allocation rule indicates percentage of traffic allocated to each MAC entity. In another embodiment, the allocation rule is derived from the network configuration parameter of UL DATA PATH, where the traffic is allocated to SCG when UL DATA PATH is set to be SCG. Otherwise, the traffic is allocated to MCG. In another embodiment, the allocation rule is derived from a configuration parameter of the split threshold, which is a threshold value for the size of available data for transmission. If the size of the total available data for transmission at the UE is smaller than the split threshold, the BSR split is not configured, where the BSR is only transmitted through one MAC entity. In one embodiment, the data and BSR are only transmitted through MCG. In another embodiment, the data and BSR are only transmitted through SCG. In one embodiment, the data available for transmission for a MAC entity includes portion of RLC SDUs that have not yet been included in an RLC data PDU, where the portion allocated to each MAC entity is based on the allocation rule, portion of RLC data PDUs that are pending for retransmission. In addition, for each MAC entity, if a STATUS PDU has been triggered and the status priority timer is not running or has expired, the UE includes the estimated size of the STATUS PDU that will be transmitted in the next transmission opportunity.

In another novel aspect, LCP is performed independently for each MAC entity if the split bearer is configured and the prioritized bit rate (PBR) and the bucket size duration (BSD) are signaled for each eNB. In one embodiment, the UE maintains a first set of logical channel variables for each of the logical channels in the first LCG by the first MAC entity. The UE maintains a second set of logical channel variables for each of the logical channels in the second LCG by the second MAC entity.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
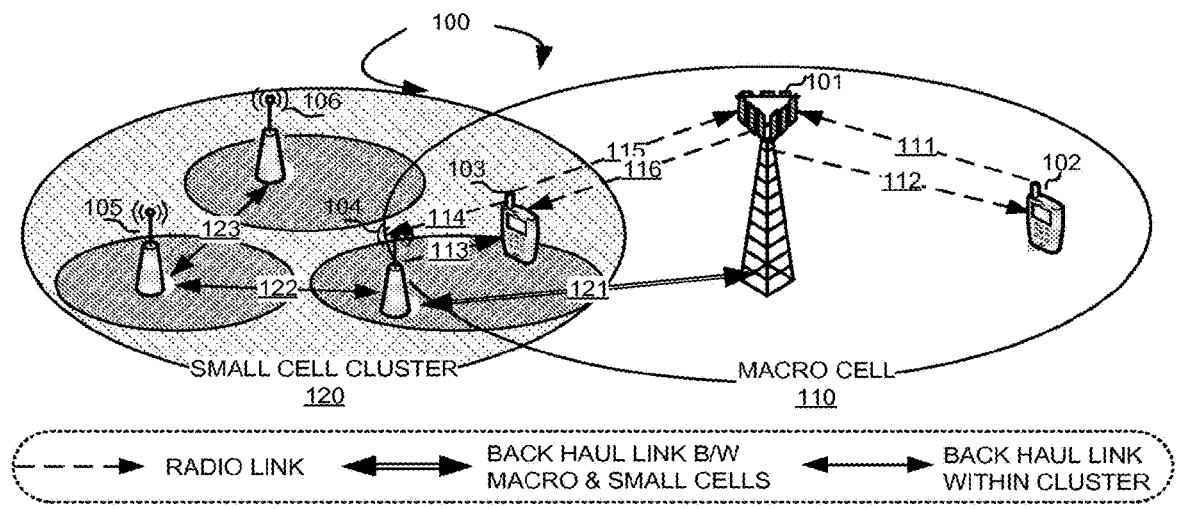
FIG. 1 illustrates a system diagram of a wireless network with dual connectivity in accordance with embodiments of the current invention.

FIG. 1 illustrates a system diagram of a wireless network 100 with dual connectivity in accordance with embodiments of the current invention. Wireless network 100 comprises a main base station eNB, also referred as a macro eNB 101, UEs with dual connectivity 102, 103, and small cell eNBs 104, 105 and 106. Wireless network 100 supports multiple component carriers over different frequency channels, dual connectivity, and carrier aggregation for serving cells originated from different eNBs. A UE 102 is served by eNB 101 with an uplink 111 and down link 112. UE 102 is served by Macro Cell 110 only because eNB 101 is the only base station in range. UE 103, however, is in the range with eNB 101 and eNB 104. When UE 103 is configured with dual connectivity, UE 103 is served by eNB 101 with uplink 115 and downlink 116. At the same time, UE 103 is also served by eNB 104 with uplink 113 and downlink 114. Wireless system 100 is configured with a Macro Cell 110, which includes the macro eNB 101 and Small Cell Cluster 120, which includes small cell eNBs 104, 105 and 106. Since UE 103 can be served with radio resources from eNB 101 and eNB 104, it may need to send BSR to one or more of the serving cells in wireless 100. Wireless network 100 can be an inter-RAT CA network, with the anchor eNB 101 employs one technology, for example LTE or other cellular standards, while drift eNBs 101 and 104 using different wireless standards, such as Wifi. Regardless of the inter-BS CA using the same standard or different standard, UE 103 is configured to associate with different schedulers in each of the base stations eNB 101 and eNB 104. Upon detecting a BSR triggering event, UE 103 needs to decide to which base station the BSR should be sent. Further, UE 103 needs to decide upon preparing for transmission the method for LCP for configured different logical channels.

In one exemplary configuration, initially, UE 103 camps on the macro cell served by eNB 101. UE 101 establishes Radio Resource Control (RRC) connection with the Radio Access Network (RAN). eNB 101 provides and controls the initial RRC connection and provides NAS mobility information and security input. eNB 101 is the anchor eNB for UE 103. UE 101 subsequently moves within the coverage area of anchor eNB 101 while moving into the coverage area of eNB 104 in small cell cluster 120. Upon entering eNB 104 coverage area, UE 101 can offload some traffic to eNB 104 if needed. In such situation, inter-eNB carrier aggregation can be configured for UE 101. UE 101 can use additional resources from eNB 103, which is a drift eNB in the small cell network system.

In one exemplary configuration, backhaul connection 121 connects macro cell eNB 101 with small cell eNB 104 through Xn interface, for example, X3 or X2 interface. The coordination between anchor eNB 102 and drift eNB 103 can be performed through Xn interface, for example, X3 or X2 interface. The Xn interfaces, also known as backhaul connections provide communication and coordination between eNBs. Similarly, backhaul connection 122 within the small cell cluster connects small cell eNBs 104 and 105 through Xn interface. However, heavy reliance on such interface introduces undesirable delays for the system.

Figure 2:
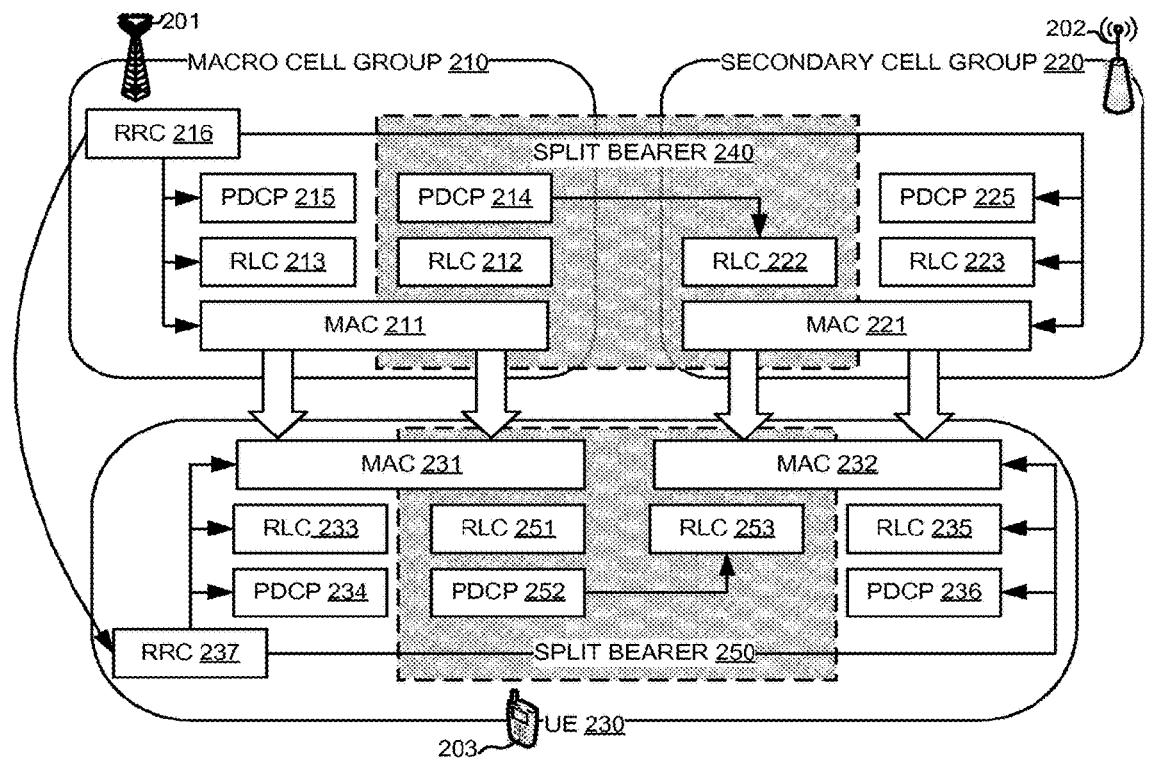
FIG. 2 shows an exemplary diagram of the dual connectivity protocol stacks with inter-eNB carrier aggregation enabled.

FIG. 2 shows an exemplary diagram of the dual connectivity protocol stacks with inter-eNB carrier aggregation enabled. A UE 203 with dual connectivity is configured with inter-eNB carrier aggregation connecting with an eNB 201 and an eNB 202. eNB 201 is configured with a macro cell group (MCG) 210. eNB 202 is configured a secondary cell group (SCG) 220. UE 203, through inter-eNB carrier aggregation, is configured with cell group 230. eNB 201 has a MAC entity 211. Two sets of upper layer stack are configured. A RLC 213 communicates with MAC 211 and further communicates with a PDCP layer 215. PDCP 215, RLC 213 and MAC 211 forms MCG bearer protocol stack that carries data communication for MCG bearers only. Similarly, eNB 202 has a MAC entity 221. Two sets of upper layer stacks are configured. An RLC 223 communicates with MAC 221 and further communicates with a PDCP layer 225. PDCP 225, RLC 223 and MAC 221 forms SCG bearer protocol stack that carries data communication for SCG bearers only. A split bearer 240 is formed with protocol stacks served from both eNB 201 and eNB 202. An RLC layer 212 communicates with MAC 211 and further communicates with a PDCP layer 214 inside eNB 201. An RLC layer 222 communicates with MAC 221 inside eNB 202. RLC layer 222, however, is controlled by PDCP 214 in eNB 201 to form split bearer 240. PDCP 214 controls RLC layers from both eNB 201 and eNB 202 for split bearer 240. At the radio resource control (RRC) layer, only one RRC 216 in eNB 201 is configured. RRC 216 controls the protocol stacks in both eNB 201 and eNB 202 by communicating with a corresponding RRC layer entity in UE 203.

UE 203 with dual connectivity has two MAC entities, MAC entity 231 and MAC entity 232. Two sets of upper layer stacks are configured for MAC entity 231. An RLC 233 communicates with MAC 231 and further communicates with a PDCP layer 234. PDCP 234, RLC 233 and MAC 231 forms MCG bearer protocol stack that carries data communication for MCG bearers only. A split bearer 250 is formed for split bearers from both eNB 201 and eNB 202. An RLC layer 251 communicates with MAC 231 and further communicates with a PDCP layer 252. Similarly, two sets of upper layer stacks are configured for MAC entity 232. An RLC layer 235 communicates MAC entity 232 and further communicates with a PDCP layer 236. PDCP 236, RLC 235 and MAC 232 forms SCG bearer protocol stack that carries data communication for SCG bearers only. An RLC layer 253, however, is controlled by PDCP 252 to form split bearer 250. PDCP 236 controls RLC layers 235 and 253 for split bearer 250. At the RRC layer, only one RRC 237 is configured. RRC 237 controls the protocol stacks in corresponding to MAC entities 231 and 232 by communicating with RRC 216 in eNB 201.

Figure 3:
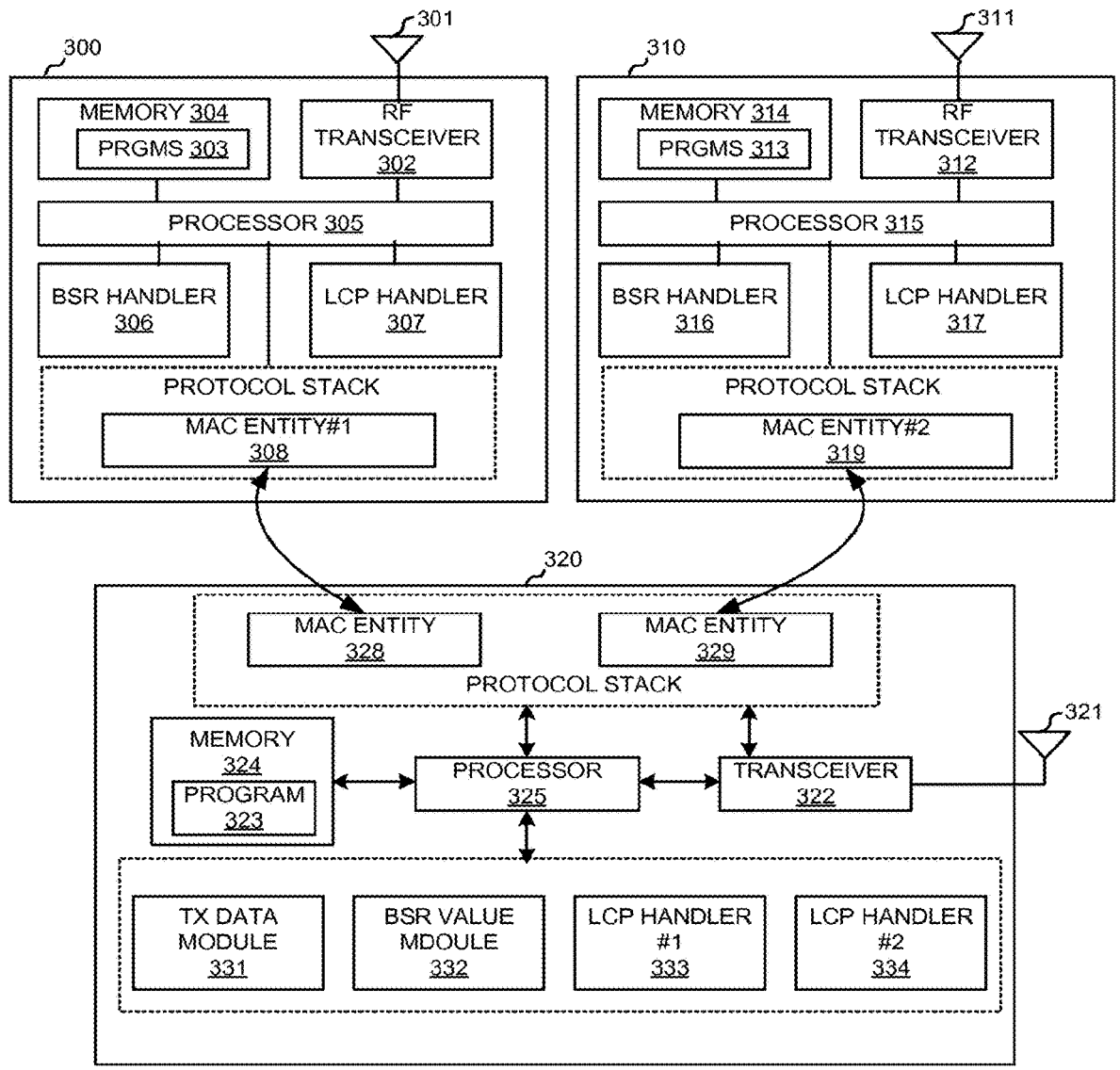
FIG. 3 shows exemplary block diagrams of a UE with dual connectivity configured with inter-eNB CA from two exemplary eNBs.

FIG. 3 shows exemplary block diagrams of a UE with dual connectivity configured with inter-eNB CA from two exemplary eNBs. A base station (eNB) 300 and a base station 310 are connected with a UE 320, which is configured with inter-eNB CA with dual connectivity. Base station 300 has an antenna 301, which transmits and receives radio signals. A RF transceiver module 302, coupled with the antenna, receives RF signals from antenna 301, converts them to baseband signals and sends them to processor 305. RF transceiver 302 also converts received baseband signals from processor 305, converts them to RF signals, and sends out to antenna 301. Processor 305 processes the received baseband signals and invokes different functional modules to perform features in base station 300. Memory 304 stores program instructions and data 303 to control the operations of base station 300. Base station 300 also includes a protocol stack with a MAC 308 that communicates with UEs. Base station 300 also includes functional blocks 306 and 307. In one embodiment, a BSR handler 306 handles BSR process in eNB 300 to support BSR processes supporting inter-eNB carrier aggregation with dual connectivity. In another embodiment, an LCP handler 307 handles LCP process eNB 300 to support LCP processes supporting inter-eNB carrier aggregation with dual connectivity.

Similarly, base station 310 has an antenna 311, which transmits and receives radio signals. A RF transceiver module 312, coupled with the antenna, receives RF signals from antenna 311, converts them to baseband signals and sends them to processor 315. RF transceiver 312 also converts received baseband signals from processor 315, converts them to RF signals, and sends out to antenna 311. Processor 315 processes the received baseband signals and invokes different functional modules to perform features in base station 310. Memory 314 stores program instructions and data 313 to control the operations of base station 310. Base station 310 also includes a protocol stack with a MAC 318 that communicates with UEs. Base station 310 also includes functional blocks 316 and 317. In one embodiment, a BSR handler 316 handles BSR process in eNB 310 to support BSR processes supporting inter-eNB carrier aggregation with dual connectivity. In another embodiment, an LCP handler 317 handles LCP process eNB 310 to support LCP processes supporting inter-eNB carrier aggregation with dual connectivity.

UE 320 is configured with inter-eNB carrier aggregation with two MAC entities, MAC entity 328 and MAC entity 329. UE 320 has an antenna 321, which transmits and receives radio signals. A RF transceiver module 322, coupled with the antenna, receives RF signals from antenna 321, converts them to baseband signals and sends them to processor 325. RF transceiver 322 also converts received baseband signals from processor 325, converts them to RF signals, and sends out to antenna 321. Processor 325 processes the received baseband signals and invokes different functional modules to perform features in UE 320. Memory 324 stores program instructions and data 323 to control the operations of UE 320. UE 320 also includes functional blocks in accordance with embodiments of the current invention. A transmission data module 331 determines an amount of available data for transmission. A BSR value module 332 calculates a MCG buffer status value for the first MAC entity and a SCG buffer status value for the second MAC based on an allocation rule and the determined amount of available data for transmission. AN LCP module #1 333 prioritizes logic channels of the first LCG of UE 320. In one embodiment, the first LCG corresponds to the MCG LCG. AN LCP module #2 334 prioritizes logic channels of the second LCG of UE 320. In one embodiment, the second LCG corresponds to the SCG LCG.

Figure 4:
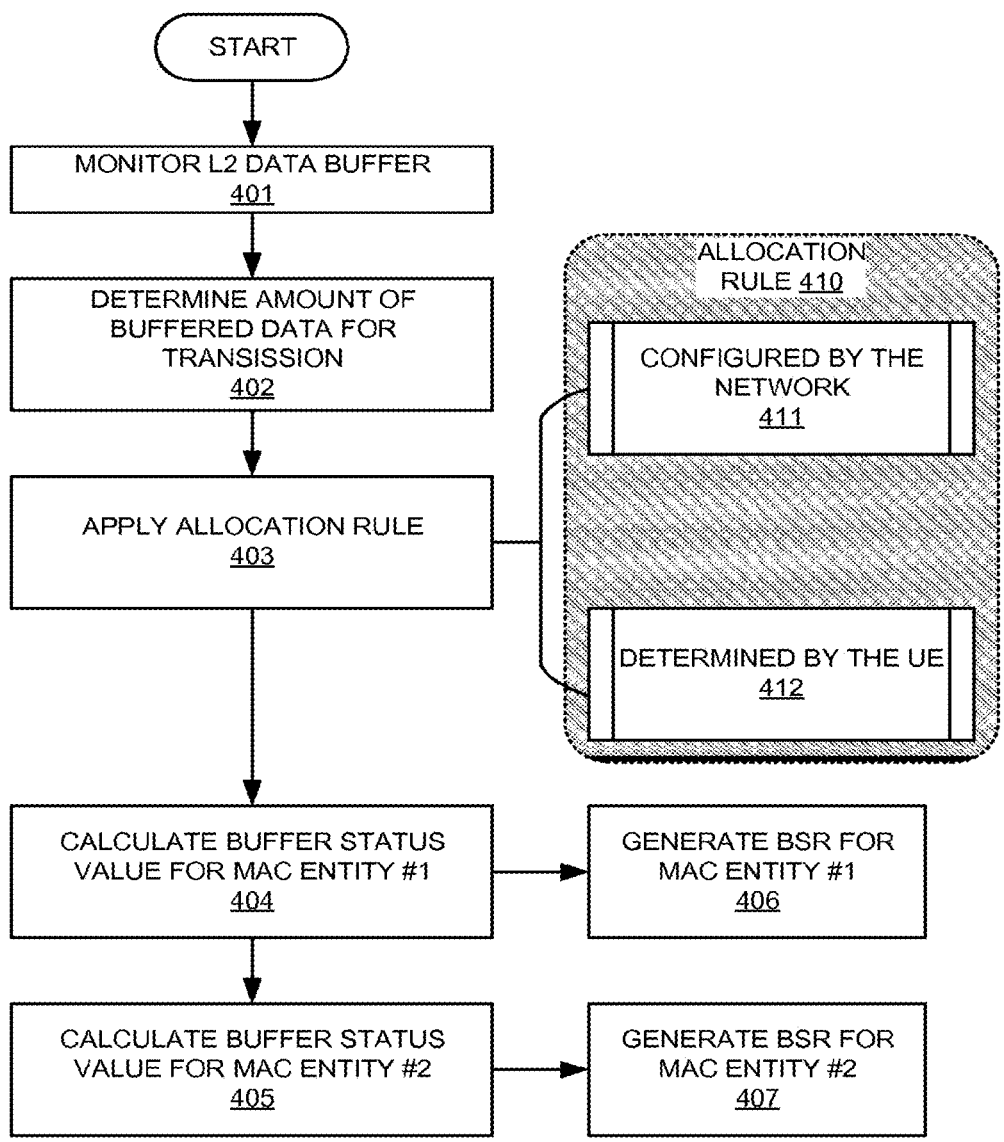
FIG. 4 illustrates exemplary flow chart of BSR handling with dual connectivity configured in accordance with embodiments of the current invention.

FIG. 4 illustrates exemplary flow chart of BSR handling with dual connectivity configured in accordance with embodiments of the current invention. At step 401, the UE monitors layer data buffer. At step 402, the UE determines the amount of buffered data for transmission. At step 403, the UE applies one or more allocation rules to the determined amount of buffered data. FIG. 4 also shows an allocation rule set 410, which includes a rule 411 and a rule 412. In one embodiment, allocation rule 411 is applied, where the allocation rule used in step 403 is configured by a network entity. In one embodiment, the network configures a percentage of traffic to be allocated to each MAC entity. In another embodiment, allocation rule 412 is applied, where the allocation rule used in step 403 is determined by the UE. In one embodiment, the UE determines a percentage of traffic to be allocated to each MAC entity based on historical throughput statistics. In another embodiment, the UE determines a percentage of traffic to be allocated to each MAC entity based on information received from one or more eNBs. After the allocation rule is applied at step 403, the UE moves to step 404 to calculate the buffer status value for MAC entity #1. At step 405, the UE calculates the buffer status value for MAC entity #2. At step 406, the UE generates BSR for MAC entity #1 based on the value calculated at step 404. At step 407, the UE generates BSR for MAC entity #2 based on the value calculated at step 405.

Figure 5:
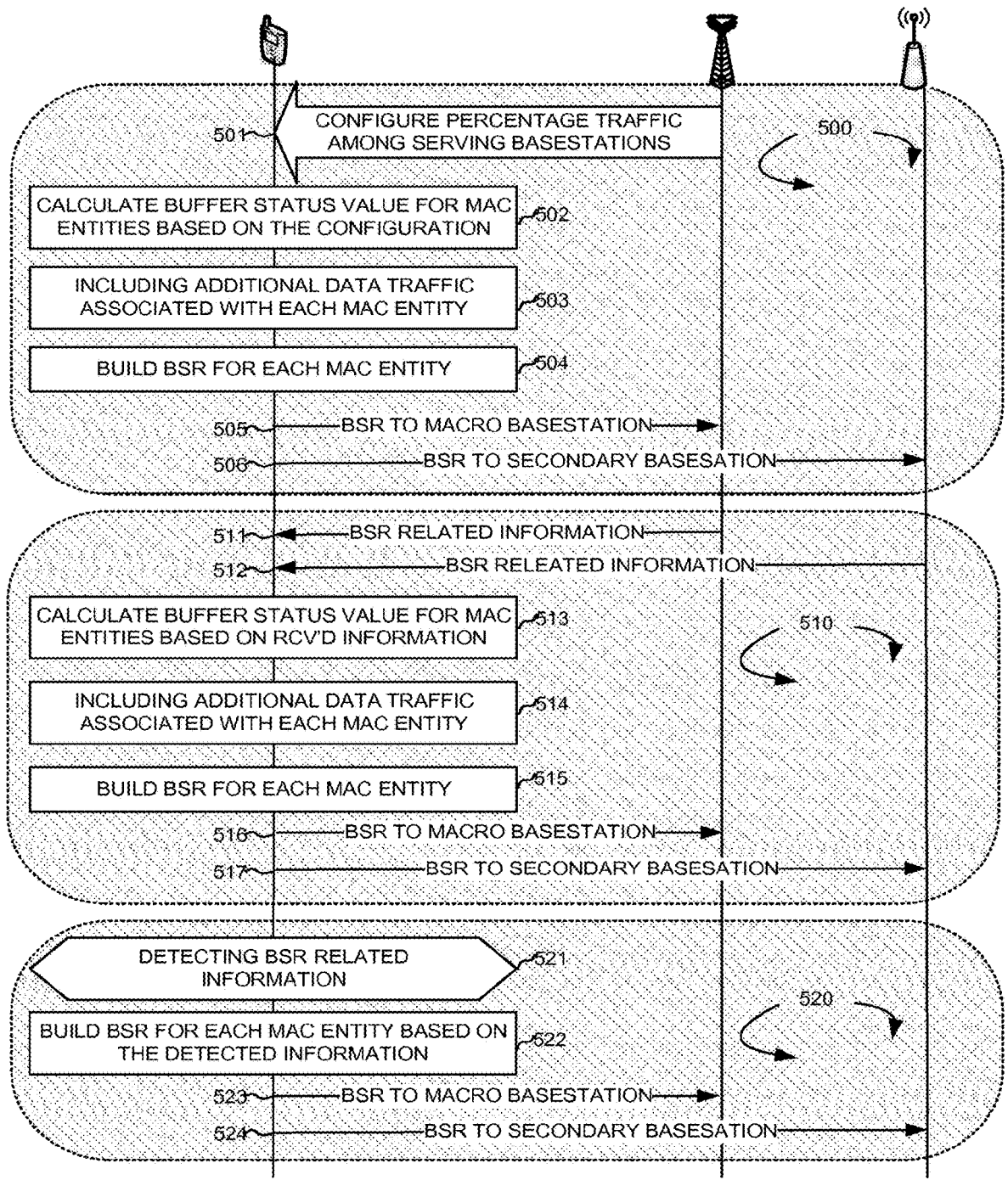
FIG. 5 illustrates details of BSR generation for the dual connectivity UE based on different allocation rules in accordance to embodiments of the current invention.

FIG. 5 illustrates details of BSR generation for the dual connectivity UE based on different allocation rules in accordance to embodiments of the current invention. FIG. 5 includes three exemplary allocation rule procedures 500, 510 and 520. Rule allocation procedure 500 illustrates the allocation rule configured by the network. At step 501, a network entity configures percentages of traffic to be allocated among serving base stations. In one embodiment, the UE receives the network configuration from the macro eNB it is connected. In another embodiment, the UE receives the network configuration from a secondary eNB it is connected. At step 502, the UE calculates a buffer status value for each MAC entities to the corresponding serving base stations based on the percentage configured for the common data. At step 503, the UE further includes additional data traffic associates with each MAC entity, such as the size of the status PDU when status PDU is triggered and the status prohibit is not running or has expired. At step 504, the UE builds BSR for each MAC entity. At step 505, the UE sends the first BSR to the macro base station. At step 506, the UE sends the second BSR to the secondary base station.

Rule allocation procedure 510 illustrates the allocation rule determined by the UE based on information from the network. At step 511, the UE receives BRS related information from the macro eNB. At step 512, the UE receives BSR related information from the secondary eNB. It is understood by one of ordinary skills in the art that in other embodiment, the UE may only receive the BSR related information from one eNB or a subset of connected eNBs. At step 513, the UE calculates a buffer status value for each MAC entities to the corresponding serving base stations based on the percentage configured for the common data. At step 514, the UE further includes additional data traffic associates with each MAC entity, such as the size of the status PDU when status PDU is triggered and the status prohibit is not running or has expired. At step 515, the UE builds BSR for each MAC entity. At step 516, the UE sends the first BSR to the macro base station. At step 517, the UE sends the second BSR to the secondary base station.

Rule allocation procedure 520 illustrates the allocation rule determined by the UE based on local information. At step 521, the UE detects BSR related information, such as historical statistics information. At step 522, the UE builds BSR for each MAC entity based on the detected information. At step 523, the UE sends the first BSR to the macro base station. At step 524, the UE sends the second BSR to the secondary base station.

Figure 6A:
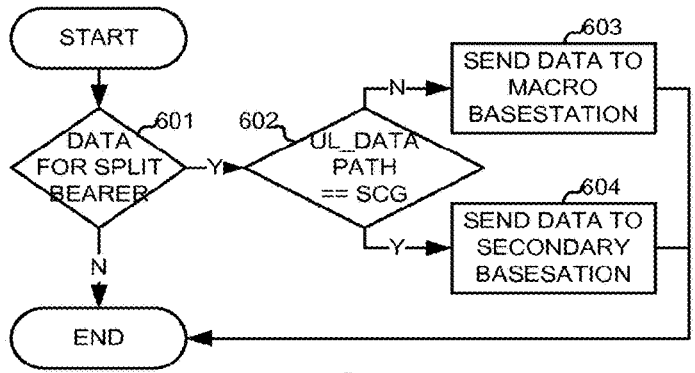
FIG. 6A illustrates an exemplary flow chart of traffic allocation for split hearers based on the network configuration.

FIG. 6A illustrates an exemplary flow chart of traffic allocation for split bearers based on the network configuration. At step 601, the UE checks whether the buffered data is for the split bearer. If no, the process ends. If yes, the UE moves to step 602 and checks if the UL_DATA_PATH is configured to be SCG. If step 602 determines no, the UE moves to step 603 and send the data to the macro base station. If step 602 determines yes, the UE moves to step 604 and send the data to the secondary base station.

Figure 6B:
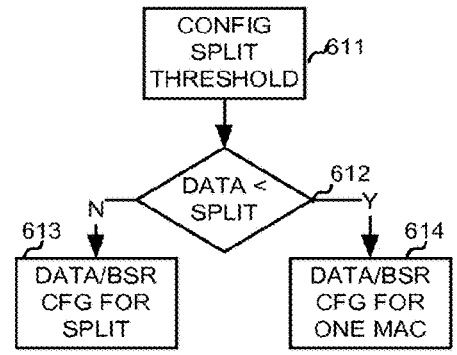
FIG. 6B illustrates an exemplary flow chart of traffic allocation rule based on a configured split threshold in accordance with embodiments of the current invention.

FIG. 6B illustrates an exemplary flow chart of traffic allocation rule based on a configured split threshold in accordance with embodiments of the current invention. At step 611, a split threshold is configured. The split threshold indicates a threshold for the total available data for transmission in the UE buffer. In one embodiment, the split threshold is configured by the network. In another embodiment, the split threshold is predefined in the UE. The split threshold can be configured/reconfigured dynamically as well. At step 612, the UE determines if the size of the available data for transmission is smaller than the split threshold. If step 612 determines no, the UE continues with the normal split bearer configurations accordingly. If step 612 determines yes, the UE does not configure the split BSR. In one embodiment, all data traffic is configured to MCG where the MCG buffer status value includes the size of all available data for transmission. In another embodiment, all data traffic is configured to SCG where the SCG buffer status value includes the size of all available data for transmission.

Figure 7:
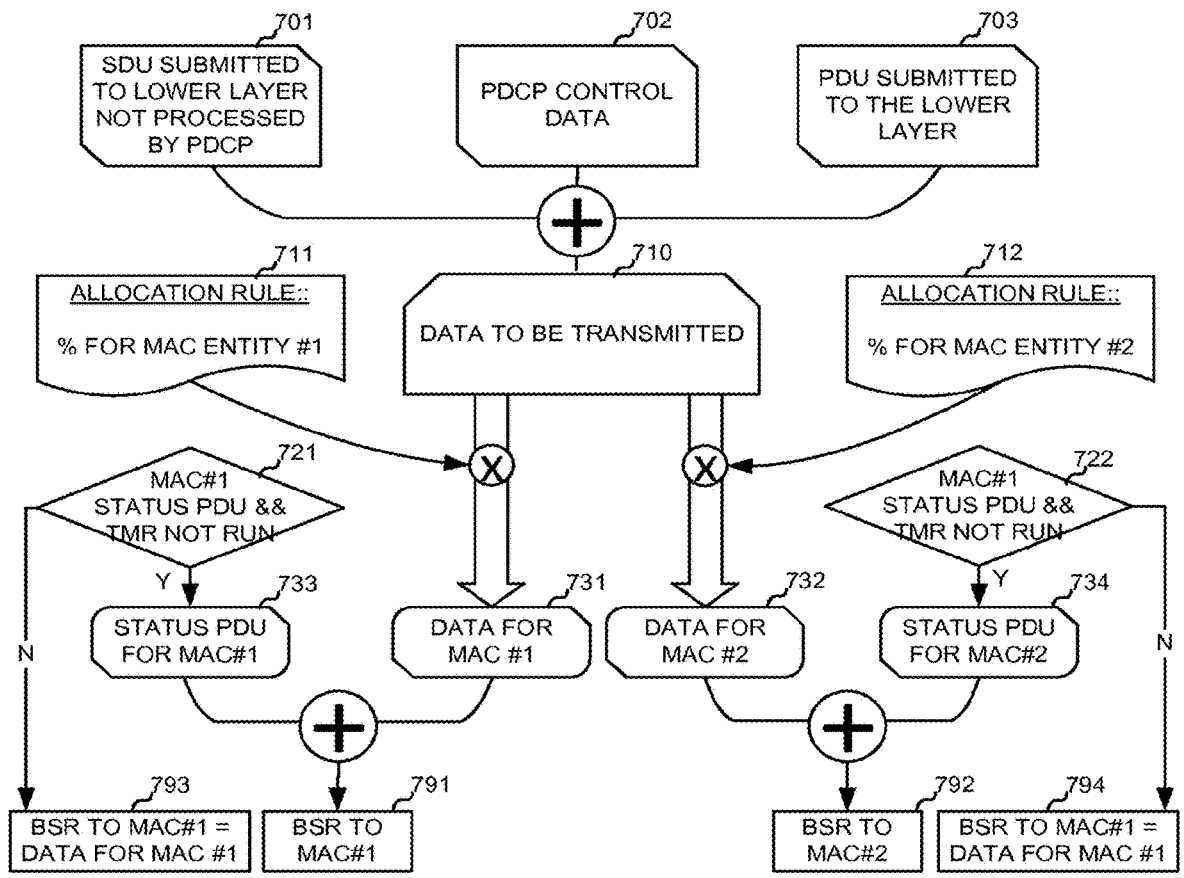
FIG. 7 illustrate an exemplary block diagram of the UE determining the amount of buffer status value in accordance to embodiments of the current invention.

FIG. 7 illustrate an exemplary block diagram of the UE determining the amount of buffer status value in accordance to embodiments of the current invention. At steps 701, the UE determines the size of RLC SDU submitted to the lower layer but has not been included an RLC data PDU. At step 702, the UE determines the size of the PDCP control data. At step 703, the UE determines the size of the PDU that is submitted to the lower layer. The total size of data to be transmitted is determined at step 710 by adding all the transmission data together from steps 701, 702 and 703. The allocation rule is applied to the size of data to be transmitted obtained at step 710. In one embodiment, an allocation rule 711 includes the percentage of traffic allocated for MAC entity #1 of the UE. An allocation rule 712 includes the percentage of traffic allocated for MAC entity #2 of the UE. A size of transmission data for MAC entity #1 is determined at step 731 by multiply the percentage for MAC entity #1 according to rule 711 by the size of data to be transmitted determined at step 710. A size of transmission data for MAC entity #2 is determined at step 732 by multiply the percentage for MAC entity #2 according to rule 712 by the size of data to be transmitted determined at step 710. In one embodiment, at step 721, the UE determines whether the status PDU for MAC entity #1 is triggered and whether the status prohibit timer is not running. If step 721 determines that the status PDU for MAC entity #1 is triggered and the status prohibit timer is not running, the UE moves step 791 and determines the size of BSR to MAC entity #1 is the sum of data for MAC entity #1 731 and the size of the stats PDU for MAC entity #1 733. Otherwise, the UE determines at step 793, the size of BSR to MAC entity #1 equals to the data to MAC entity #1 determined at step 731. Similarly, at step 722, the UE determines whether the status PDU for MAC entity #2 is triggered and whether the status prohibit timer is not running. If step 722 determines that the status PDU for MAC entity #2 is triggered and the status prohibit timer is not running, the UE moves step 792 and determines the size of BSR to MAC entity #2 is the sum of data for MAC entity #2 732 and the size of the stats PDU for MAC entity #2 734. Otherwise, the UE determines at step 794, the size of BSR to MAC entity #2 equals to the data to MAC entity #2 determined at step 732.

Figure 8:
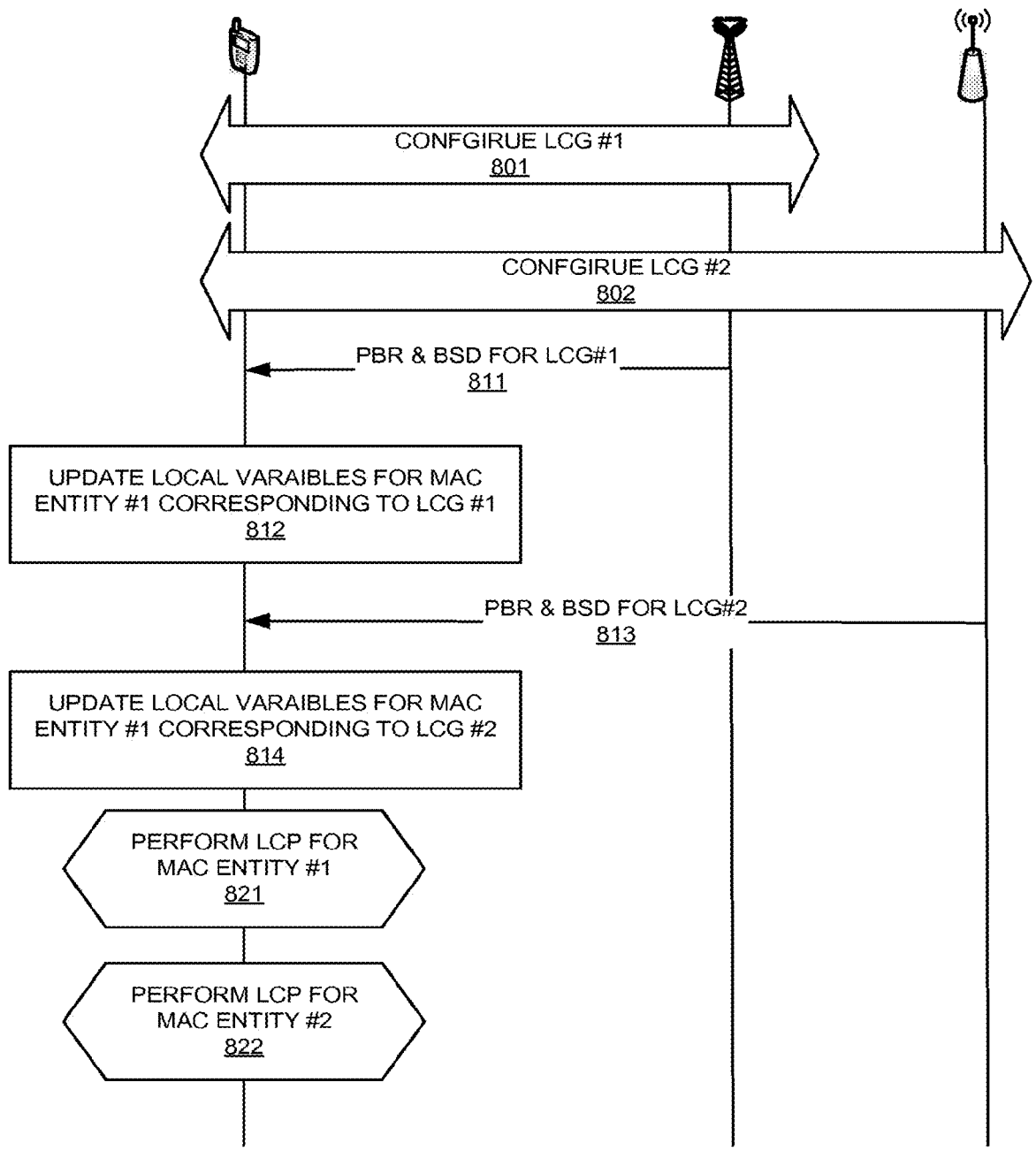
FIG. 8 illustrates an exemplary flow chart for the LCP handling for dual connectivity in accordance with embodiments of the current invention.

FIG. 8 illustrates an exemplary flow chart for the LCP handling for dual connectivity in accordance with embodiments of the current invention. At step 801, the UE configures LCG #1 with the macro eNB. At step 802, the UE configures LCG #2 with the secondary eNB. At step 811, the macro eNB sends prioritized bit rate (PBR) and bucket size duration (BSD) to the UE. At step 812, the UE updates local variables for MAC entity #1, which is configured with LCG #1 corresponding to the macro eNB. At step 813, the secondary eNB sends prioritized bit rate (PBR) and bucket size duration (BSD) to the UE. At step 814, the UE updates local variables for MAC entity #2, which is configured with LCG #2 corresponding to the secondary eNB. At step 821, the UE performs LCP for MAC entity #1. At step 822, the UE performs LCP for MAC entity #2. In one novel aspect, the LCP is performed for each MAC entity independently.

Figure 9:
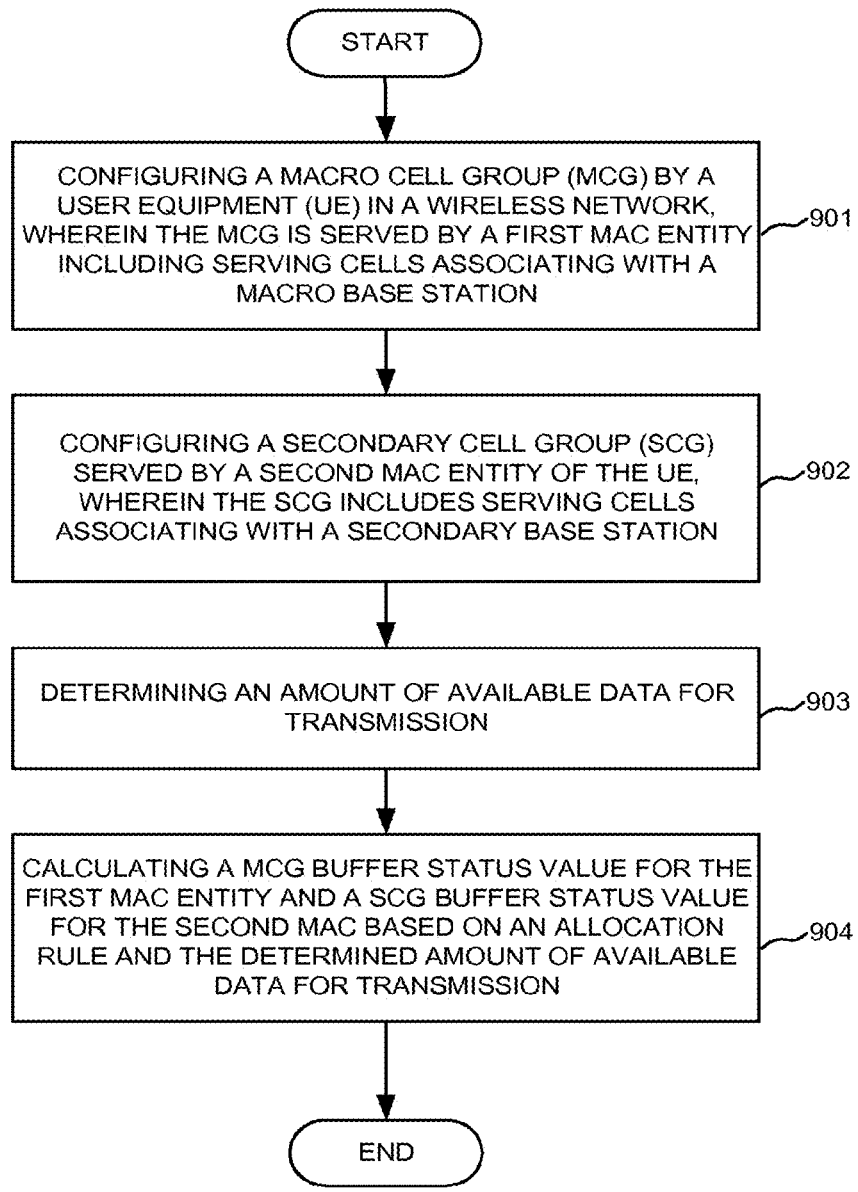
FIG. 9 is an exemplary flow chart for the BSR handling in a dual connectivity system in accordance with embodiments of the current invention.

FIG. 9 is an exemplary flow chart for the BSR handling in a dual connectivity system in accordance with embodiments of the current invention. At step 901, the UE configures a macro cell group (MCG), wherein the MCG is served by a first MAC entity including serving cells associating with a macro base station. At step 902, the UE configures a secondary cell group (SCG) served by a second MAC entity of the UE, wherein the SCG includes serving cells associating with a secondary base station. At step 903, the UE determines an amount of available data for transmission. At step 904, the UE calculates a MCG buffer status value for the first MAC entity and a SCG buffer status value for the second MAC based on an allocation rule and the determined amount of available data for transmission.

Figure 10:
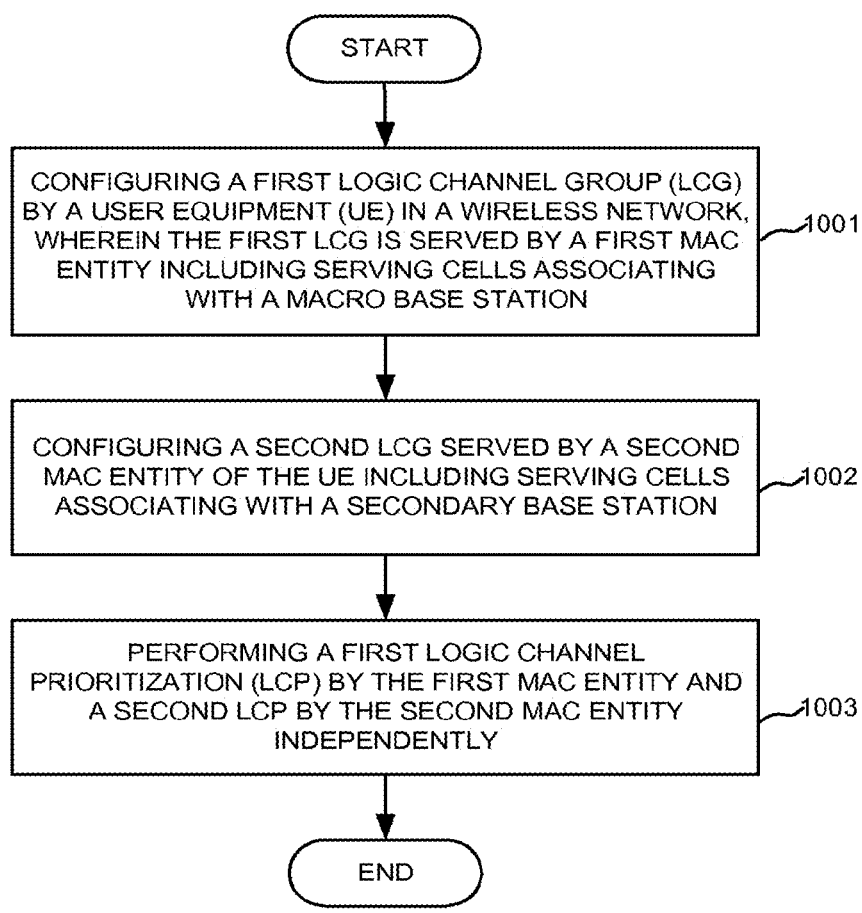
FIG. 10 is an exemplary flow chart for the LCP handling in a dual connectivity system in accordance with embodiments of the current invention.

FIG. 10 is an exemplary flow chart for the LCP handling in a dual connectivity system in accordance with embodiments of the current invention. At step 1001, the UE configures a first logic channel group (LCG), wherein the first LCG is served by a first MAC entity including serving cells associating with a macro base station. At step 1002, the UE configures a second LCG served by a second MAC entity of the UE including serving cells associating with a secondary base station. At step 1003, the UE performs a first logic channel prioritization (LCP) by the first MAC entity and a second LCP by the second MAC entity independently.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
receiving a macro cell group (MCG) configuration by a user equipment (UE) in a wireless network, wherein the MCG is served by a first medium access control (MAC) entity including serving cells associating with a macro base station;
receiving a secondary cell group (SCG) configuration served by a second MAC entity of the UE, wherein the SCG includes serving cells associating with a secondary base station;
determining an amount of available data for transmission based on a status protocol data unit (PDU),
wherein when the status PDU is triggered, determining that the amount of available data for transmission includes a sum of data and a size of the PDU; and
calculating a MCG buffer status value for the first MAC entity and a SCG buffer status value for the second MAC based on an allocation rule and the determined amount of available data for transmission, wherein the allocation rule is based on one of: (i) an uplink (UL) data path configuration, and (ii) a split threshold configuration.

2. The method of claim 1, wherein the allocation rule indicates a percentage of traffic to be transmitted by the MCG.

3. The method of claim 2, wherein the percentage of traffic is configured by a network entity.

4. The method of claim 2, wherein the percentage of traffic is determined by the UE based on the local throughput statistics of the buffered data for transmission by the UE.

5. The method of claim 2, wherein the percentage of traffic is determined by the UE based on information received from the macro base station.

6. The method of claim 2, wherein the MCG buffer status value includes a size of the available data for transmission times the percentage of traffic configured for the MCG, and wherein the SCG buffer status value includes the remaining available data for transmission.

7. The method of claim 1, wherein the allocation rule is based on an UL data path configured by upper layer, and wherein the MCG buffer status value includes the size of all available data for transmission if the UL data path is configured to be SCG, otherwise, the SCG buffer status value includes the size of all available data for transmission.

8. The method of claim 1, wherein the allocation rule is based on a configured split threshold for available data for transmission, and wherein the MCG buffer status value includes the size of all available data for transmission if the size of available data for transmission is smaller than the split threshold.

9. The method of claim 1, wherein available data for transmission includes service data units (SDUs) not submitted to lower layers that has not been processed by Packet Data Convergence Protocol (PDCP) of the UE, and PDUs if their corresponding SDUs has been processed by PDCP.

10. An user equipment (UE), comprising:
a transceiver that transmits and receives radio signals from one or more base stations in a wireless network;
a first medium access control (MAC) entity that serves a macro cell group (MCG) including serving cells associating with a macro base station;
a second MAC entity that serves a secondary cell group (SCG) including serving cells associating with a secondary base station;
a transmission data circuit that determines an amount of available data for transmission based on a status protocol data unit (PDU),
wherein when the status PDU is triggered, determining that the amount of available data for transmission includes a sum of data and a size of the PDU; and
a buffer status report (BSR) circuit that calculates a MCG buffer status value for the first MAC entity and a SCG buffer status value for the second MAC based on an allocation rule and the determined amount of available data for transmission, wherein the allocation rule is based on one of: (i) an uplink (UL) data path configuration, and (ii) a split threshold configuration.

11. The UE of claim 10, wherein the allocation rule indicates a percentage of traffic to be transmitted by the MCG.

12. The UE of claim 11, wherein the percentage of traffic is configured by a network entity.

13. The UE of claim 11, wherein the percentage of traffic is determined by the UE based on the local throughput statistics of the buffered data for transmission by the UE.

14. The UE of claim 11, wherein the percentage of traffic is determined by the UE based on information received from the macro base station.

15. The UE of claim 11, wherein the MCG buffer status value includes a size of the available data for transmission times the percentage of traffic configured for the MCG, and wherein the SCG buffer status value includes the remaining available data for transmission.

16. The UE of claim 10, wherein the allocation rule is based on an UL data path configured by upper layer, and wherein the MCG buffer status value includes the size of all available data for transmission if the UL data path is configured to be SCG, otherwise, the SCG buffer status value includes the size of all available data for transmission.

17. The UE of claim 10, wherein the allocation rule is based on a configured split threshold for available data for transmission, and wherein the MCG buffer status value includes the size of all available data for transmission if the size of available data for transmission is smaller than the split threshold.

18. The UE of claim 10, wherein available data for transmission includes service data units (SDUs) not submitted to lower layers that has not been processed by Packet Data Convergence Protocol (PDCP) of the UE, and PDUs if their corresponding SDUs has been processed by PDCP.

* * * * *